US012366896B2

(12) United States Patent
Zhang et al.

(10) Patent No.: US 12,366,896 B2
(45) Date of Patent: Jul. 22, 2025

(54) ROTATION CONNECTION STRUCTURE AND ELECTRONIC APPARATUS

(71) Applicant: Lenovo (Beijing) Limited, Beijing (CN)

(72) Inventors: Zhenling Zhang, Beijing (CN); Jiangping Wu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 217 days.

(21) Appl. No.: 18/182,889

(22) Filed: Mar. 13, 2023

(65) Prior Publication Data
US 2023/0315163 A1  Oct. 5, 2023

(30) Foreign Application Priority Data

Mar. 31, 2022  (CN) .......................... 202210332799.9

(51) Int. Cl.
G06F 1/16  (2006.01)

(52) U.S. Cl.
CPC .......... *G06F 1/1681* (2013.01); *G06F 1/1652* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,520,989 B1* | 12/2019 | Hsu | ........................ | G06F 1/1652 |
| 11,550,358 B2* | 1/2023 | Cheng | .................... | G06F 1/1681 |
| 11,611,641 B2* | 3/2023 | Cha | ...................... | H04M 1/0268 |
| 11,706,886 B2* | 7/2023 | Wu | ........................ | G06F 1/1681 |
| | | | | 361/807 |
| 11,737,223 B2* | 8/2023 | Lee | ...................... | H04M 1/0216 |
| | | | | 361/809 |
| 11,834,880 B2* | 12/2023 | Peng | ...................... | E05D 11/082 |
| 11,974,407 B2* | 4/2024 | Cao | ...................... | H05K 5/0226 |
| 2020/0329574 A1* | 10/2020 | Lee | ...................... | H04M 1/0268 |
| 2021/0303033 A1* | 9/2021 | Hong | .................. | H04M 1/0268 |
| 2021/0307181 A1* | 9/2021 | Hong | .................. | H05K 5/0017 |
| 2021/0307185 A1* | 9/2021 | Hong | .................. | H05K 5/0226 |
| 2021/0307186 A1* | 9/2021 | Hong | .................. | H04M 1/0216 |
| 2021/0318723 A1* | 10/2021 | Cheng | .................. | G06F 1/1618 |
| 2022/0104370 A1* | 3/2022 | Wu | ...................... | H05K 5/0017 |

(Continued)

FOREIGN PATENT DOCUMENTS

CN     113923279 A     1/2022

*Primary Examiner* — Lisa Lea-Edmonds
(74) *Attorney, Agent, or Firm* — ANOVA LAW GROUP, PLLC

(57) ABSTRACT

A rotation connection mechanism includes a first plate, a second plate, a control structure, and a torsion structure. The control structure is configured to control the first plate and the second plate to switch between a first relative position and a second relative position. The first plate and the second plate are at the first relative position, and the first plate and the second plate form a plate. The first plate and the second plate are at the second relative position, and the first plate faces the second plate to have a target angle. The torsion structure is configured to provide torsion support at the first relative position and the second relative position, and provide a force for the control structure to control the first plate and the second plate to switch between the first relative position and the second relative position under an external force.

16 Claims, 12 Drawing Sheets

(56) References Cited

U.S. PATENT DOCUMENTS

| | | | | |
|---|---|---|---|---|
| 2022/0361350 A1* | 11/2022 | Jung | .................... | G06F 1/1677 |
| 2022/0400565 A1* | 12/2022 | Shin | ...................... | H04M 1/02 |
| 2022/0412138 A1* | 12/2022 | Peng | .................... | E05D 3/122 |
| 2023/0171334 A1* | 6/2023 | Xu | ...................... | H04M 1/022 |
| | | | | 455/566 |
| 2023/0229204 A1* | 7/2023 | Shim | .................. | H04M 1/022 |
| | | | | 361/679.28 |
| 2023/0236641 A1* | 7/2023 | Han | ...................... | E05D 3/122 |
| | | | | 361/679.27 |
| 2023/0315163 A1* | 10/2023 | Zhang | ................ | G06F 1/1652 |
| | | | | 361/679.27 |
| 2023/0403347 A1* | 12/2023 | Liu | ...................... | H04M 1/022 |
| 2024/0040724 A1* | 2/2024 | Cao | ...................... | F16C 11/04 |
| 2024/0176395 A1* | 5/2024 | Wang | .................. | G06F 1/1616 |
| 2024/0340365 A1* | 10/2024 | Liao | .................... | H04M 1/022 |

\* cited by examiner

ROTATION CONNECTION STRUCTURE AND ELECTRONIC APPARATUS

CROSS-REFERENCE TO RELATED APPLICATION

This application claims priority to Chinese Patent Application No. 202210332799.9, filed on Mar. 31, 2022, the entire content of which is incorporated herein by reference.

TECHNICAL FIELD

The present disclosure relates to the electronic apparatus technology field and, more particularly, to a rotation connection structure and electronic apparatus.

BACKGROUND

With the development of technology, a foldable electronic apparatus such as a foldable screen cellphone and a foldable screen computer has been developed. The folding electronic apparatus realizes the switch between an unfolded posture and a folded posture by bending the foldable screen.

The folding electronic apparatus is connected to a support shell fixed to a non-bending area at two ends of the foldable screen through a rotation shaft device. The foldable screen is driven by the opening and closing of the support shell to bend. However, the existing rotation shaft device is arranged on a back side of the foldable screen opposite to a display surface. The rotation shaft device needs to individually occupy a thickness space of the whole machine of the electronic apparatus. To reduce the thickness of the whole machine, the foldable screen needs to adopt a smaller screen bending angle to reduce the thickness space of the whole machine required by the foldable screen, which increases the bending difficulty and causes more creases on the foldable screen. Thus, the performance of the foldable screen is impacted.

SUMMARY

Embodiments of the present disclosure provide a rotation connection mechanism, including a first plate, a second plate, a control structure, and a torsion structure. The control structure is configured to control the first plate and the second plate to switch between a first relative position and a second relative position. The first plate and the second plate are at the first relative position, and the first plate and the second plate form a plate. The first plate and the second plate are at the second relative position, and the first plate faces the second plate to have a target angle. The torsion structure is configured to provide torsion support at the first relative position and the second relative position, and provide a force for the control structure to control the first plate and the second plate to switch between the first relative position and the second relative position under an external force.

Embodiments of the present disclosure provide an electronic apparatus, including a first body, a second body, and a rotation connection mechanism. The first body is movably connected to the second body through the rotation connection mechanism. The first body is at a first posture with the second body through the rotation connection mechanism. A first plate of the rotation connection mechanism and a second plate of the rotation connection mechanism are at a first relative position. The first plate and the second plate form a plate. A surface of the plate is coplanar with a first surface of the first body and a second surface of the second body. The first body is at a second posture with the second body through the rotation connection mechanism. The first plate of the rotation connection mechanism and the second plate of the rotation connection mechanism are at the second relative position. The first plate faces the second plate to have a target angle.

DETAILED DESCRIPTION OF THE EMBODIMENTS

Figure 1:
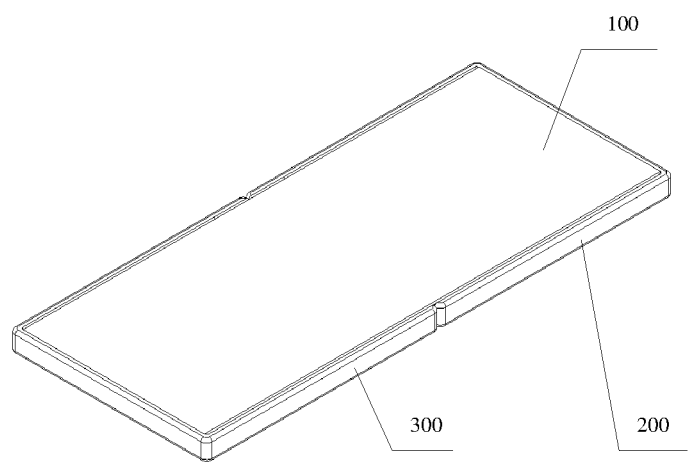
FIG. 1 illustrates a schematic structural diagram of an electronic apparatus according to some embodiments of the present disclosure.

The present disclosure discloses a rotation connection structure to ensure the usability of a foldable screen. The present disclosure also provides an electronic apparatus having the above rotation connection structure.

The technical solutions of embodiments of the present disclosure are described in detail below in connection with the accompanying drawings of embodiments of the present disclosure. Described embodiments are only some embodiments of the present disclosure, not all embodiments. Based on embodiments of the present disclosure, all other embodiments obtained by those of ordinary skill in the art without creative efforts should be within the scope of the present disclosure.

Embodiments of the present disclosure provide a rotation connection mechanism. The rotation connection mechanism can include a first plate, a second plate, a control structure, and a torsion structure. The control structure can be configured to control the first plate and the second plate to switch between a first relative position and a second relative position. The first plate and the second plate can be in the first relative position, and the first plate and the second plate can be arranged to form a flat plate. The first plate and the second plate can be in the second relative position, and the first plate can face the second plate to have a target angle. The torsion structure can be configured to provide torsion support in the first relative position and the second relative position and provide a force for the control structure to control the first plate and the second plate to switch between the first relative position and the second relative position under an action of an external force.

In the rotation connection mechanism of embodiments of the present disclosure, the first plate and the second plate can be controlled to switch between the first relative position and the second relative position through the control structure. The torsion support can be provided at the first relative position and the second relative position through the torsion structure. Under the action of the external force, the torsion structure can be configured to provide the force for the control structure to control the first plate and the second plate to switch between the first relative position and the second relative position. According to the above arrangement, the first plate and the second plate can be switched between the first relative position and the second relative position, and the states of the first plate and the second plate at the first relative position and the second relative position can be supported.

The first plate and the second plate can be in the first relative position. The first plate and the second plate can form a flat plate. Thus, a gap between the first plate and the second plate can be small or zero. The torsion support can be provided at the first relative position through the torsion structure to ensure the stability of the first plate and the second plate at the first relative position. Thus, the first plate and the second plate can provide effective support to the foldable screen (e.g., a flexible display touch screen) on a side of the plate formed by the first plate and the second plate. When the first plate and the second plate are switched from the first relative position to the second relative position, the external force can be provided through an operator or an apparatus. Under the action of the external force, the torsion structure can provide the force for the control structure to control the first plate and the second plate to switch between the first relative position and the second relative position. Thus, the control structure can control the first plate and the second plate to switch between the first relative position and the second relative position. The first plate and the second plate can be at the second relative position, and the first plate can face the second plate to have the target angle. Thus, the first plate and the second plate can perform bending guidance on the foldable screen (e.g., flexible display touch screen) between the first plate and the second plate. The torsion structure can provide the torsion support at the second relative position to ensure the reliability of the first plate and the second plate at the second relative position. Thus, the foldable screen (e.g., flexible display touch screen) can realize the predetermined target screen bending angle. When the first plate and the second plate are switched from the second relative position to the first relative position, the external force can be provided by the operator or the apparatus. Under the action of the external force, the torsion structure can provide the force for the control structure to control the first plate and the second plate to switch from the first relative position and the second relative position. Thus, the control structure can control the first plate and the second plate to switch between the second relative position and the first relative position. Under the action of the control structure and the torsion structure, a bending operation can be facilitated. At the first relative position, the first plate and the second plate can form one plate. Thus, one side of the plate formed by the first plate and the second plate can provide support to the foldable screen (e.g., flexible display touch screen). At the second relative position, the first plate can face the second plate to have the target angle to facilitate the bending of the foldable screen (e.g., flexible display touch screen) to reduce the probability of ceases to appear on the foldable screen, which ensures the application performance of the foldable screen.

The first plate and the second plate can be at the second relative position. The first plate and the second plate can be arranged symmetrically relative to a center line.

As shown in FIG. 1 to FIG. 19, a rotation connection mechanism 400 is connected a flexible display touch screen 100, a first body 300, and a second body 200. A relative position of the first body 300 and the second body 200 can be changed by an external force, which drives the rotation connection mechanism 400 to rotate. A first plate 410 of the rotation connection mechanism 400 can be connected to the first body 300 and one end of the flexible display touch screen 100. A second plate 420 can be connected to the second body 200 and the other end of the flexible display touch screen 100. A control structure 430 and a torsion structure 440 are connected to an intermediate connection shell 450 and are connected to the first plate 410 and the second plate 420.

The control structure 430 and the torsion structure 440 are located on one side of the intermediate connection shell 450. A side of the control structure 430 and the torsion structure 440 away from the intermediate connection shell 450 is connected to the first plate 410 and the second plate 420.

As shown in FIG. 3 to FIG. 6, the first plate 410 and the second plate 420 are in the first relative position and are configured to shield the control structure 430 and/or the torsion structure 440. To cause the first plate 410 and the second plate 420 to be in the first relative position to shield the control structure 430 and/or the torsion structure 440, the gap between the first plate 410 and the second plate 420 may need to be ensured to be very small. Thus, the first plate 410 and the second plate 420 can provide effective support for a middle area of the flexible display touch screen 100 (a combined position of the first plate 410 and the second plate 420). Thus, the flexible display touch screen 100 can be prevented from sinking during application to facilitate the normal application of the flexible display touch screen 100.

Figure 7:
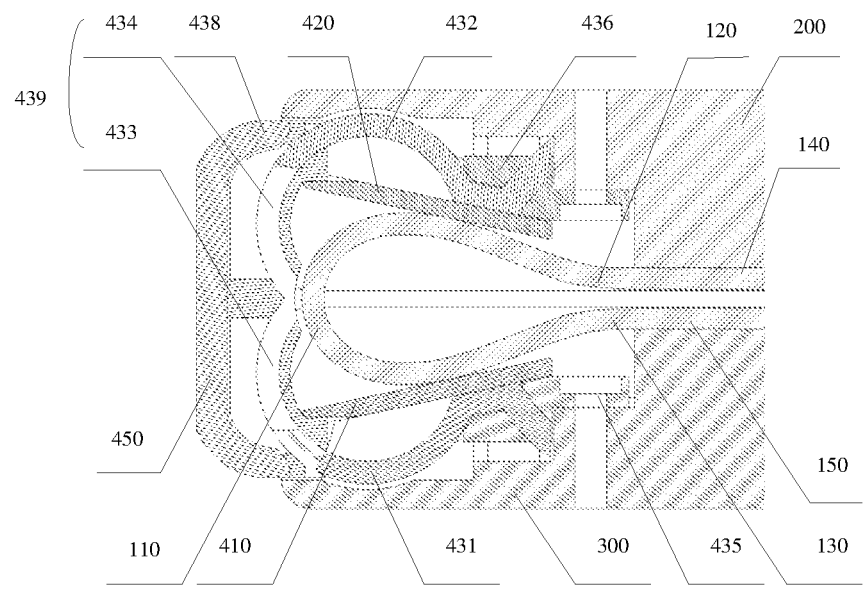
FIG. 7 illustrates a schematic sectional diagram showing a second posture of an electronic apparatus according to some embodiments of the present disclosure.
Figure 8:
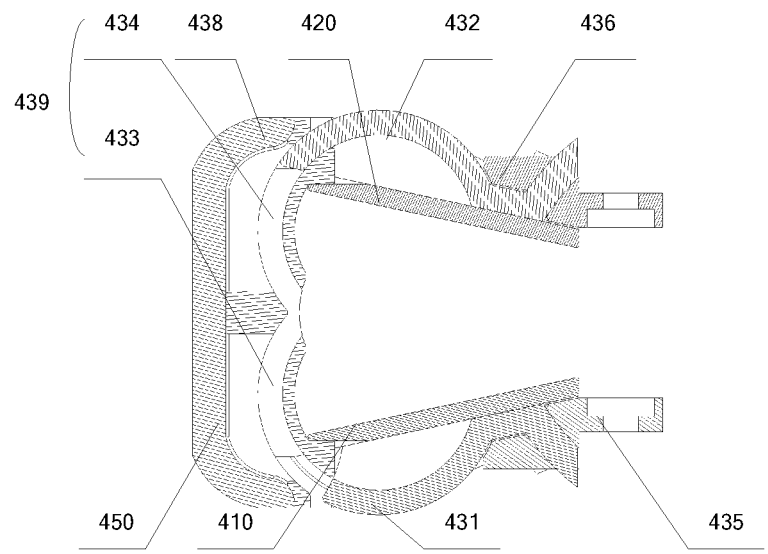
FIG. 8 illustrates a schematic sectional diagram showing a second relative position of a rotatable connection mechanism according to some embodiments of the present disclosure.

As shown in FIG. 7 and FIG. 8, the first plate 410 and the second plate 420 are in the second relative position and are configured to form a space in the rotation connection structure. By accommodating the bent middle area of the flexible display touch screen 100 through the accommodating space, the bent middle area can be prevented from being pressed by the first plate 410 and the second plate 420. Thus, the structural stability of the bent middle area can be ensured.

In the first relative position, the first plate 410 and the first body 300 may need to be relatively parallel to cause the first plate 410 and a surface of the first body 300 facing the second plate 420 to form a plane to support the flexible display touch screen 100. Moreover, in the second relative position, the first plate 410 and the first body 300 can be arranged at an angle. A connection angle of the first plate 410 and the first body 300 may need to have a convex area facing the center line of the first plate 410 and the second plate 420 to match a first outward folding area on a side of the flexible display touch screen 100.

Similarly, in the first relative position, the second plate 420 and the second body 200 may need to be relatively parallel. Thus, the second plate 420 and the surface of the second body 200 facing the first plate 410 can form a plane, which is configured to support the flexible display touch screen 100. Moreover, in the second relative position, the second plate 420 and the second body 200 can be arranged to have an angle. The connection angle between the second plate 420 and the second body 200 may need to have the convex area toward the centerline of the first plate 410 and the second plate 420 to match a second outward folding area on a side of the flexible display touch screen 100.

Moreover, the first plate 410 and the second plate 420 can be in the first relative position, and the first plate 410 and the second plate 420 can form the plate. The first plate 410 and the second plate 420 can be in the second relative position, and the first plate 410 can face the second plate 420 to have the target angle. Thus, the flexible display touch screen 100 can be located at an inward folding area between the first outward folding area and the second outward folding area.

In connection with the above arrangement, the first plate 410 and the second plate 420 can be in the first relative position. The first plate 410 and the second plate 420 can form the plate. The first plate 410 and the surface of the first body 300 facing the second plate 420 can form the plane, and the second plate 420 and the surface of the second body 200 facing the first plate 410 can form the plane, which can jointly support the flexible display touch screen 100 in the unfolded posture. Thus, the flexible display touch screen 100 can be in a planar state and can be effectively supported by the first body 300, the first plate 410, the second plate 420, and the second body 200. Thus, the application performance of the flexible display touch screen 100 can be ensured.

In some embodiments, the first plate 410 and the second plate 420 can be in the second relative position. The first plate 410 can face the second plate 420 to have the target angle. The first plate 410 and the first body 300 can be arranged at an angle. The connection angle of the first plate 410 and the first body 300 can have the convex area toward the centerline of the first plate 410 and the second plate 420. The second plate 420 and the second body 200 can be arranged at an angle. The connection angle of the second plate 420 and the second body 200 can have the convex area toward the centerline of the first plate 410 and the second plate 420. Corresponding to the inward folding area and a first outward folding area and a second outward folding area arranged on two sides of the inward folding area of the flexible display touch screen 100, a droplet structure can be formed in the middle area of the flexible display touch screen 100. Thus, the total thickness of two ends of the flexible display touch screen 100 can be reduced to reduce the thickness of the whole machine. In addition, the screen folding angle of the flexible display touch screen 100 can be increased to further reduce the probability of creases appearing on the flexible display touch screen 100.

As shown in FIG. 5 to FIG. 8, the control structure 430 controls the first plate 410 and the second plate 420 to switch between the first relative position and the second relative position through a first set of arc-shaped sliding rails and a second set of arc-shaped sliding rails. The first set of arc-shaped sliding rails can be configured to control the first plate 410 and the second plate 420 to face each other and be at the target angle. The second set of arc-shaped sliding rails can control the first plate 410 and the second plate 420 to be arranged at an angle relative to the first body 300 and the second body 200.

To ensure the stability of switching the first barrier 410 and the second barrier 420 between the first relative position and the second relative position, ends of the first plate 410 and the second plate 420 that are away from each other and ends of the first plate 410 and the second plate 420 that are close to each other may need to have corresponding controls. The first set of arc-shaped sliding rails and the second set of arc-shaped sliding rails can be structures for controlling the positions of the two ends of the first plate 410 and the second plate 420, respectively.

The first set of arc-shaped sliding rails can be configured to control the position change of the ends of the first plate 410 and the second plate 420 far away from each other. The second set of arc-shaped sliding rails can be configured to control the position change of the ends of the first plate 410 and the second plate 420 close to each other.

The first plate 410 and the second plate 420 can be in the second relative position. The first plate 410 and the second plate 420 can have the target angle. The first plate 410 and the first body 300 can have a second angle, and the second plate 420 and the second body 200 can have a second angle. To cause the middle area of the flexible display touch screen 100 to form bending of the droplet structure, the inward folding area can have different bending degrees with the first outward folding area and the second outward folding area. Thus, the target angle can be different from the second angle. The second set of arc-shaped sliding rails can be configured to control the position change of ends of the first plate 410 and the second plate 420 close to each other. Thus, the ends of the first plate 410 and the second plate 420 close to each other can move along an arc trajectory of the second set of arc-shaped rails to form the target angle. The first set of arc-shaped rails can be configured to control the position change of the ends of the first plate 410 and the second plate 420 away from each other. Thus, the ends of the first plate 410 and the second plate 420 away from each other can move along the arc trajectory of the first set of arc-shaped sliding rails. The first plate 410 can have the second angle with the first body 300, and the second plate 420 can have the second angle with the second body 200.

Since the purpose is to form the droplet structure in the middle area of the flexible display touch screen 100, a radius of the first set of arc-shaped sliding rails can be different from a radius of the second set of arc-shaped sliding rails.

In some embodiments, the radius of the first set of arc-shaped sliding rails can be larger than the radius of the second set of arc-shaped sliding rails. That is, when the first plate 410 and the second plate 420 can be at the second relative position. The target angle can be smaller than the second angle. Thus, at the second relative position, the space formed in the rotation connection structure can accommodate the droplet structure formed by bending the middle area of the flexible display touch screen 100.

The rotation connection mechanism 400 can include a first connector 435 and a second connector 436. The first connector 435 can be configured to be fixedly connected to the first body 300 of the electronic apparatus. The second connector 436 can be configured to be fixedly connected to the second body 200 of the electronic apparatus.

The control structure 430 can include a sliding support 439 and a sliding assembly. The sliding support 439 can slidingly cooperate with the sliding assembly.

The sliding support 439 can be connected to the intermediate connection shell 450.

The sliding assembly can include a first slider 431 and a second slider 432. The first slider 431 can be fixed to the first plate 410 and located on a side of the first plate 410. The second slider 432 can be fixed to the second plate 420 and located on a side of the second plate 420.

The position adjustment of the first plate 410 and the second plate 420 can be realized by the first slider 431 and the second slider 432.

The first set of arc-shaped sliding rails can include a first sub-arc-shaped sliding rail 4351 and a second sub-arc-shaped sliding rail 4361. The first sub-arc-shaped sliding rail 4351 can be arranged at the first connector 435. The second sub-arc-shaped sliding rail 4361 can be arranged at the second connector 436. The first sub-arc sliding rail 4351 and the second sub-arc sliding rail 4361 can be symmetrical. The first sub-arc sliding rail 4351 and the second sub-arc sliding rail 4361 can be sliding chutes or arc-shaped sliding surfaces. In some embodiments, each of the first sub-arc sliding rail 4351 and the second sub-arc sliding rail 4361 can have two arc-shaped sliding surfaces. Taking the first sub-arc sliding rail 4351 as an example, the first sub-arc sliding rail 4351 can have two arc-shaped sliding surfaces. Centers of the two arc-shaped sliding surfaces can coincide and have different radii. Thus, an arc-shaped gap can be formed between the two arc-shaped sliding surfaces. Similarly, an arc-shaped gap can be also formed between the two arc-shaped sliding surfaces of the second sub-arc-shaped sliding rail 4361.

The second set of arc-shaped sliding rails can include a third sub-arc-shaped sliding rail 4391 and a fourth sub-arc-shaped sliding rail 4392. The third sub-arc-shaped sliding rail 4391 and the fourth sub-arc-shaped sliding rail 4392 can be symmetrically arranged on the sliding support 439. To improve sliding stability, each of the third sub-arc sliding rail 4391 and the fourth sub-arc sliding rail 4392 can also have two arc-shaped sliding surfaces. Taking the third sub-arc sliding rail 4391 as an example, centers of two arc-shaped sliding surfaces of the third sub-arc-shaped sliding rail 4391 can coincide and have different radii. Thus, an arc-shaped gap can be formed between the two arc-shaped sliding surfaces. Similarly, an arc-shaped gap can be also formed between the two arc-shaped sliding surfaces of the fourth sub-arc-shaped sliding rail 4392.

The first slider 431 can slide in the first sub-arc sliding rail 4351 and the third sub-arc sliding rail 4391. To slide correspondingly to the first sub-arc sliding rail 4351 and the third sub-arc sliding rail 4391, the first slider 431 can include a first arc-shaped member 4311 and a second arc-shaped member 4312. The first arc-shaped member 4311 can match the third sub-arc sliding rail 4391. The second arc-shaped member 4312 can match the first sub-arc sliding rail 4351.

Since the radius of the first set of arc-shaped sliding rails is greater than the radius of the second set of arc-shaped sliding rails, the radius of the first sub-arc-shaped sliding rail 4351 (e.g., a radius of the arc-shaped sliding surface close to the first plate 410, a radius of the arch-shaped sliding surface away from the first plate 410, or a radius of a centerline of the arch-shaped gap between the two arch-shaped sliding surfaces) can be greater than the radius of the third sub-arc-shaped sliding rail 4391 (e.g., a radius of the arch-shaped sliding surface close to the first plate 410, a radius of the arch-shaped sliding surface away from the first plate 410, or a radius of a center line of the arch-shaped gap between the two arch-shaped sliding surfaces).

Similarly, the second slider 432 can slide in the second sub-arc-shaped sliding rail 4361 and the fourth sub-arc-shaped sliding rail 4392. To slide correspondingly to the second sub-arc-shaped sliding rail 4361 and the fourth sub-arc-shaped sliding rail 4392, the second slider 432 can include a third arc-shaped member 4321 and a fourth arc-shaped member 4322. The third arc-shaped member 4321 can match the fourth sub-arc-shaped sliding rail 4392. The fourth arc-shaped member 4322 can match the second sub-arc-shaped sliding rail 4361.

Since the radius of the first set of arc-shaped sliding rails is greater than the radius of the second set of arc-shaped sliding rails, the radius of the second sub-arc-shaped sliding rail 4361 (e.g., a radius of the arc-shaped sliding surface close to the second plate 420, a radius of the arc-shaped sliding surface away from the second plate 420, or a radius of the centerline of the arc-shaped gap formed between the two arc-shaped sliding surfaces) can be greater than the radius of the fourth sub-arc-shaped sliding rail 4392 (e.g., a radius of the arc-shaped sliding surface of the second plate 420, a radius of the arc-shaped sliding surface away from the second plate 420, or a radius of the centerline of the arc-shaped gap formed between the two arc-shaped sliding surfaces).

Figure 9:
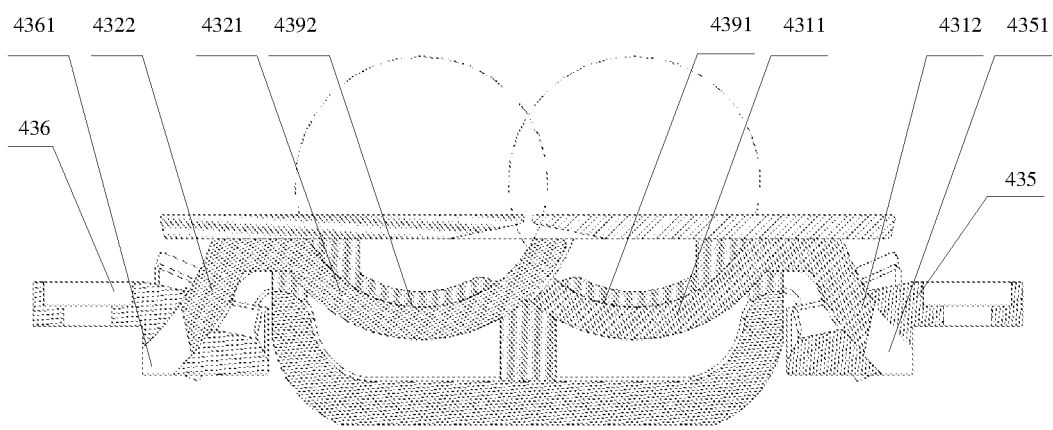
FIG. 9 illustrates a schematic diagram showing an arc extension line of a second group of arc-shaped sliding tracks according to some embodiments of the present disclosure.
Figure 10:
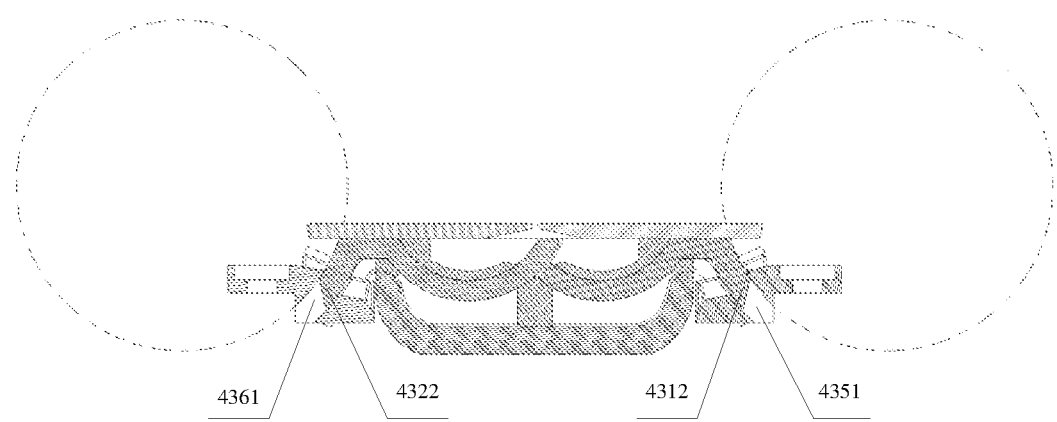
FIG. 10 illustrates a schematic diagram showing an arc extension line of a first group of arc sliding tracks according to some embodiments of the present disclosure.
Figure 11:
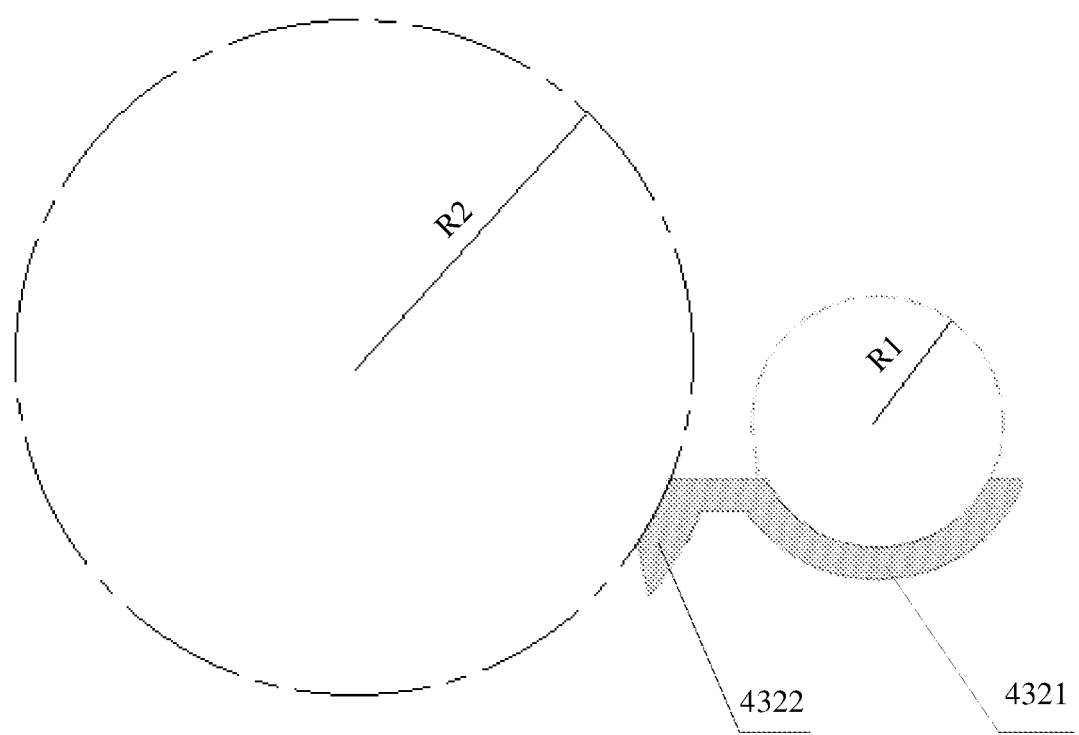
FIG. 11 illustrates a schematic structural diagram of a second slider according to some embodiments of the present disclosure.
Figure 12:
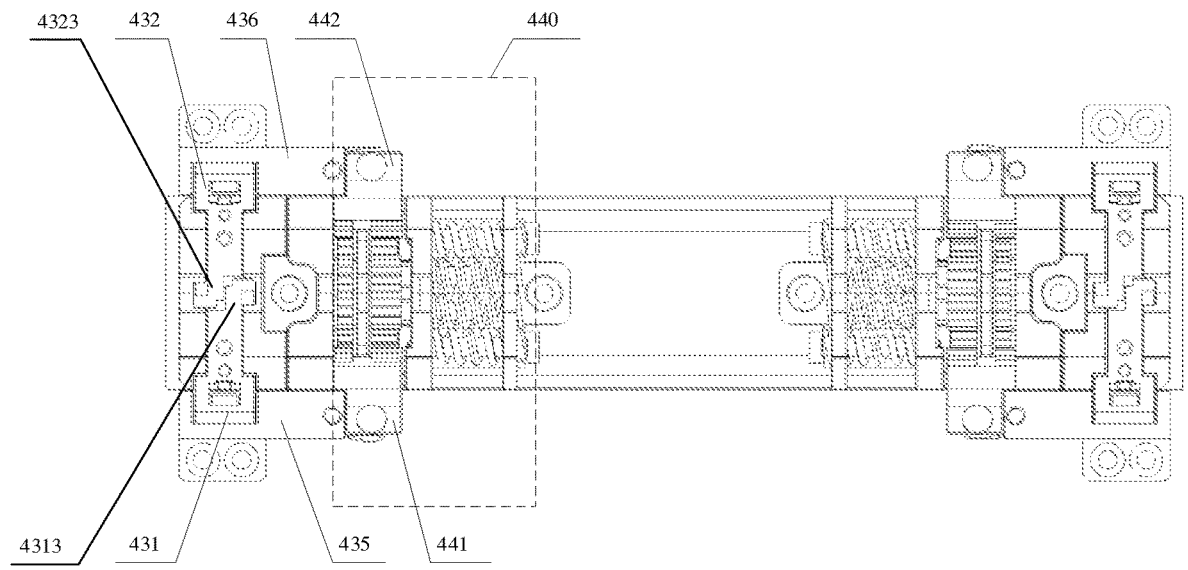
FIG. 12 illustrates a schematic main diagram showing a rotatable connection mechanism at a first relative position by removing a first plate and a second plate according to some embodiments of the present disclosure.

As shown in FIG. 9 to FIG. 11, a circle formed by an extension line of the arc-shaped sliding surface of the fourth sub-arc-shaped sliding rail 4392 close to the second plate 420 and a circle formed by an extension line of the arc-shaped sliding surface of the third sub-arc-shaped sliding rail 4391 close to the first plate 410 can have the same structure. The radius of the circle can be R1.

A circle formed by an extension line of the arc-shaped sliding surface of the second sub-arc-shaped sliding rail 4361 close to the second plate 420 and a circle formed by an extension line of the arc-shaped sliding surface of the first sub-arc-shaped sliding rail 4351 close to the first plate 410 can have the same structure. The radius of the circle can be R2.

R2 can be greater than R1.

Figure 19:
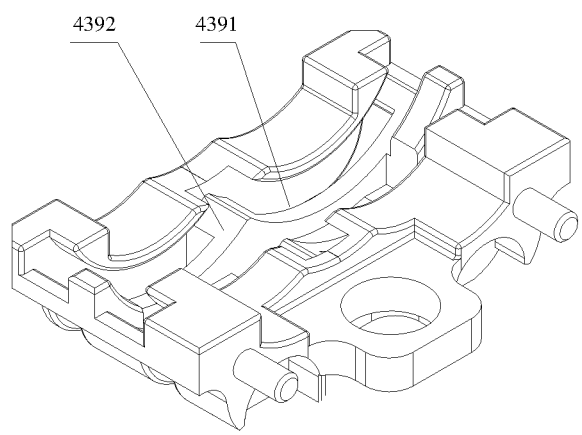
FIG. 19 illustrates a schematic structural diagram of a sliding track member according to some embodiments of the present disclosure.

As shown in FIG. 9 and FIG. 19, the fourth sub-arc-shaped sliding rail 4392 intersects with the third sub-arc-shaped sliding rail 4391.

The arc-shaped sliding surface of the fourth sub-arc-shaped sliding rail 4392 close to the second plate 420 and the arc-shaped sliding surface of the third sub-arc-shaped sliding rail 4391 close to the first plate 410 can be used as reference surfaces for description. The radius of the arc-shaped sliding surface of the fourth sub-arc-shaped sliding rail 4392 close to the second plate 420 and the radius of the arc-shaped sliding surface of the third sub-arc-shaped sliding rail 4391 close to the first plate 410 can be R1. A distance between a center of the arc-shaped sliding surface of the fourth sub-arc-shaped sliding rail 4392 close to the second plate 420 and a center of the arc-shaped sliding surface of the third arch-shaped sliding rail 4391 close to the first plate 410 can be shorter than 2R1. Thus, the arch-shaped surface of the fourth sub-arc-shaped sliding rail 4392 close to the second plate 420 can intersect the arc-shaped sliding surface of the third sub-arc sliding rail 4391 close to the first plate 410 at the extension line of the circle where the arc-shaped sliding surface is located. Similarly, the fourth sub-arc-shaped sliding rail 4392 can intersect an arc-shaped sliding surface of the third sub-arc-shaped sliding rail 4391 at another corresponding position. In some embodiments, the fourth sub-arc-shaped sliding rail 4392 can also be tangent to or separated from the third sub-arc-shaped sliding rail 4391, which is not limited in the present disclosure.

Through the above arrangement, the first slider 431 sliding along the fourth sub-arc-shaped sliding rail 4392 can be relatively close to the second slider 432 sliding along the third sub-arc-shaped sliding rail 4391 at the first relative position. Thus, the first plate 410 fixed by the first slider 431 and the second plate 420 fixed to the second slider 432 can be driven to be relatively close to each other at the first relative position. Therefore, the distance between the first plate 410 and the second plate 420 can be effectively reduced possibly to make the first plate 410 and the second plate 420 close to each other, which ensures effective support for the middle area of the flexible display touch screen 100.

To avoid interference between the first slider 431 and the second slider 432 when the first slider 431 and the second slider 432 move close to each other, the first slider 431 can include a first avoidance member 4313 on a side of the first slider 431 facing the second slider 432. The second slider 432 can include a second avoidance member 4323 on a side of the second slider 432 facing the first slider 431. During switching to the first relative position, the first avoidance member 4313 of the first slider 431 can cooperate with the second avoidance member 4323 of the second slider 432. Thus, the first slider 431 and the second slider 432 can continue to slide until the first plate 410 and the second plate 420 are at the first relative position.

In some embodiments, the first avoidance member 4313 of the first slider 431 and the second avoidance member 4323 of the second slider 432 can have a concave-convex cooperation. That is, when the first plate 410 and the second plate 420 are at the first relative position, the first avoidance member 4313 of the first slider 431 can have the concave-convex cooperation with the second avoidance member 4323 of the second slider 432. By avoiding the interference between the first slider 431 and the second slider 432, the position where the first slider 431 and the second slider 432 have the concave-convex cooperation can effectively support the first slider 431 and the second slider 432. Thus, the structural stability of the first plate 410 and the second plate 420 can be further improved at the first relative position.

Figure 18:
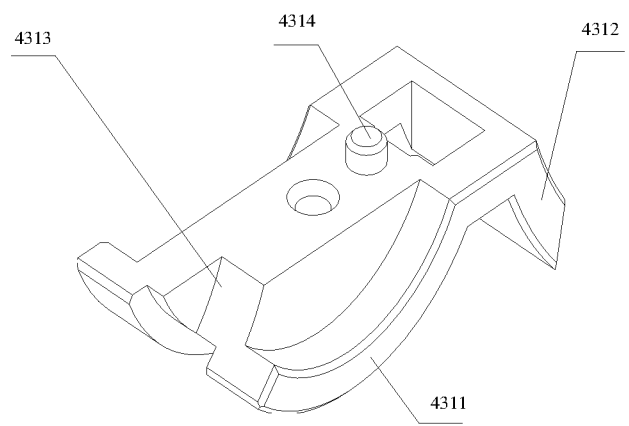
FIG. 18 illustrates a schematic structural diagram of a first slider according to some embodiments of the present disclosure.

As shown in FIG. 18, the first avoidance member 4313 can be arranged on an end of the first arc-shaped member 4311 away from the second arc-shaped member 4312. Moreover, the first slider 431 further includes a positioning column 4314 that is positioned and connected to the first plate 410. The first plate 410 can include a positioning cooperating with the positioning column 4314 to facilitate the poisoning and connection of the first slider 431 and the first plate 410.

The rotation connection mechanism can also include a movable connection assembly. The movable connection assembly can include a first movable connector and a second movable connector. The first connector 435 can be connected to a first transmission arm 441 of the torsion structure through the first movable connector. The connector 436 can be connected to a second transmission arm 442 of the torsion structure through the second movable connector.

The first connector 435 and the second connector 436 cannot be rotatably connected to other members of the control structure 430 along the axis but move along the arc-shaped sliding rail. The first transmission arm 441 of the torsion structure and the second transmission arm 442 of the torsion structure can need to be rotatably connected to other members of the torsion structure along the axis to provide the torsion through the rotational force. Therefore, to avoid the interference or stuck between the first connector 435 and the first transmission arm 441 of the torsion structure during transmission, the first connector 435 can be connected to the first transmission arm 441 of the torsion structure through the first movable connector. Similarly, the second connector 436 can be connected to the second transmission arm 442 of the torsion structure through the second movable connector.

By taking the first movable connector as an example, the first movable connector may need to convert the movement of the first connector 435 along the arc-shaped sliding rail into the rotation of the first transmission arm 441 of the torsion structure around the axis. Thus, the force can be transmitted through the rotation.

Figure 13:
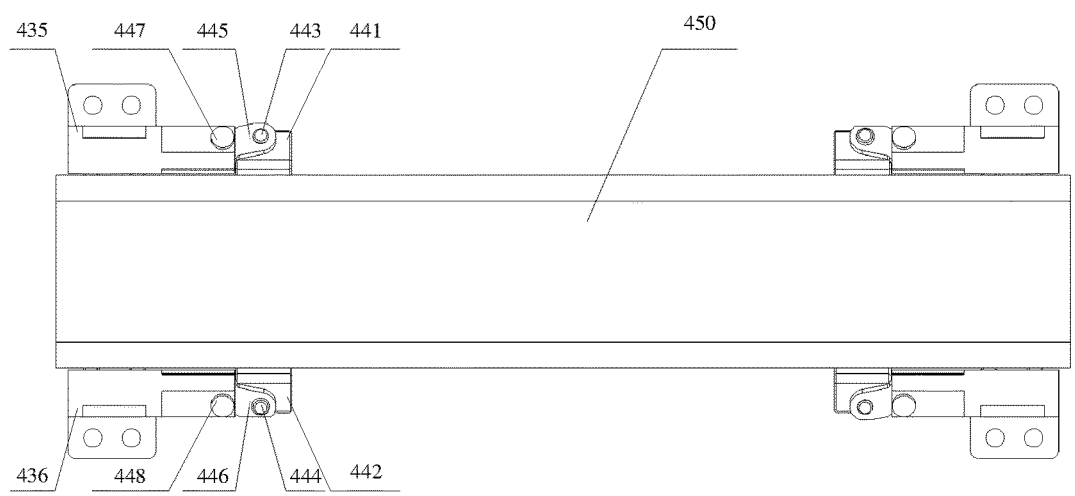
FIG. 13 illustrates a schematic rear view showing a rotatable connection mechanism at a first relative position by removing a first plate and a second plate according to some embodiments of the present disclosure.
Figure 14:
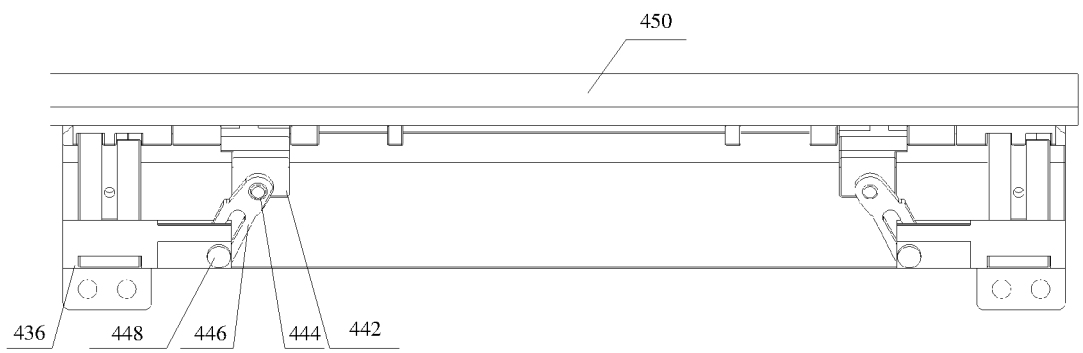
FIG. 14 illustrates a schematic structural diagram showing a rotatable connection mechanism at a second relative position by removing a first plate and a second plate according to some embodiments of the present disclosure.

As shown in FIG. 13 and FIG. 14, the first movable connector includes a first sliding rail pull ring 445, a first transmission arm shaft 443, and a first connection sliding fitting member 447. The first sliding rail pull ring 445 includes a belt-shaped hole. The first connection sliding fitting member 447 can slidably and rotatably cooperate with the waist-shaped hole. The first connection sliding fitting member 447 can be connected to the first connector 435. The first transmission arm shaft 443 can be rotatably connected to the first sliding rail pull ring 445 and the first transmission arm 441. The first sliding rail pull ring 445 can rotate relative to the first transmission arm 441 along the first transmission arm shaft 443 through the first transmission arm shaft 443. In addition, through the sliding and rotation of the first connection sliding fitting member 447 in the waist-shaped hole, the first connection sliding fitting member 447 can be connected to the first connector 435.

Similarly, the second movable connector includes a second sliding rail pull ring 446, a second transmission arm shaft 444, and a second connection sliding fitting member 448. The second sliding rail pull ring 446 can include a waist-shaped hole. The second connection sliding fitting member 448 can slidably and rotatably cooperate with the waist-shaped hole. The second connection sliding fitting member 448 can be connected to the second connector 436. The second transmission arm shaft 444 can be rotatably connected to the second sliding rail pull ring 446 and the second transmission arm 442. The second sliding rail pull ring 446 can rotate around the axis of the second transmission arm shaft 444 relative to the first transmission arm 442 through the second transmission arm shaft 444. Thus, through the sliding and rotation of the second connection sliding fitting member 448 in the waist-shaped hole, the second sliding fitting member 448 can be connected to the second connector 436.

As shown in FIG. 13, at the first relative position, the second sliding rail pull ring 446 can rotate around the second transmission arm shaft 444. The second connection sliding fitting member 448 can slide and rotate in a direction away from the second transmission arm 442 in the waist-shaped hole. Thus, the second connection sliding fitting member 448 and the second transmission arm 442 can move away from each other to cause the second sliding rail pull ring 446 to be connected between the second transmission arm 442 and the second connector 436 at an inclined angle.

As shown in FIG. 14, in the second relative position, the second sliding rail pull ring 446 rotates along the second transmission arm shaft 444. The second connection sliding fitting member 448 can slide and rotate in the waist-shaped hole in the direction away from the second transmission arm 442. Thus, the second connection sliding fitting member 448 and the second transmission arm 442 can move away from each other to cause the second sliding rail pull ring 446 to be connected between the second transmission arm 442 and the second connector 436 at an inclined angle.

Through the above movable connector, the machine can have a mechanical characteristic of a folding movement. A movement characteristic such as free hovering can be realized.

For the description of switching the first movable connector between the first relative position and the second relative position, a reference can be made above, which is not repeated here.

The movable connector group can be applied to the torsion structure and can be configured to provide the force for the control structure to control the first plate and the second plate to switch between the first relative position and the second relative position. Thus, the torsion structure may need to convert the external force into the force to switch the first plate and the second plate between the first relative position and the second relative position.

Figure 15:
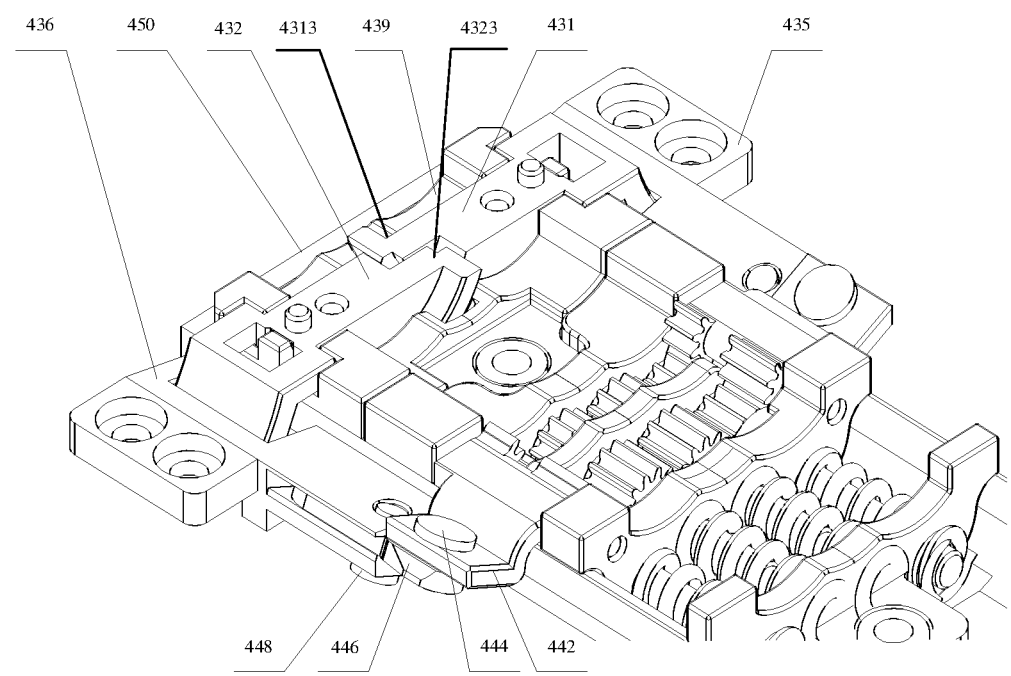
FIG. 15 illustrates a schematic local enlarged diagram showing part A in FIG. 4.
Figure 16:
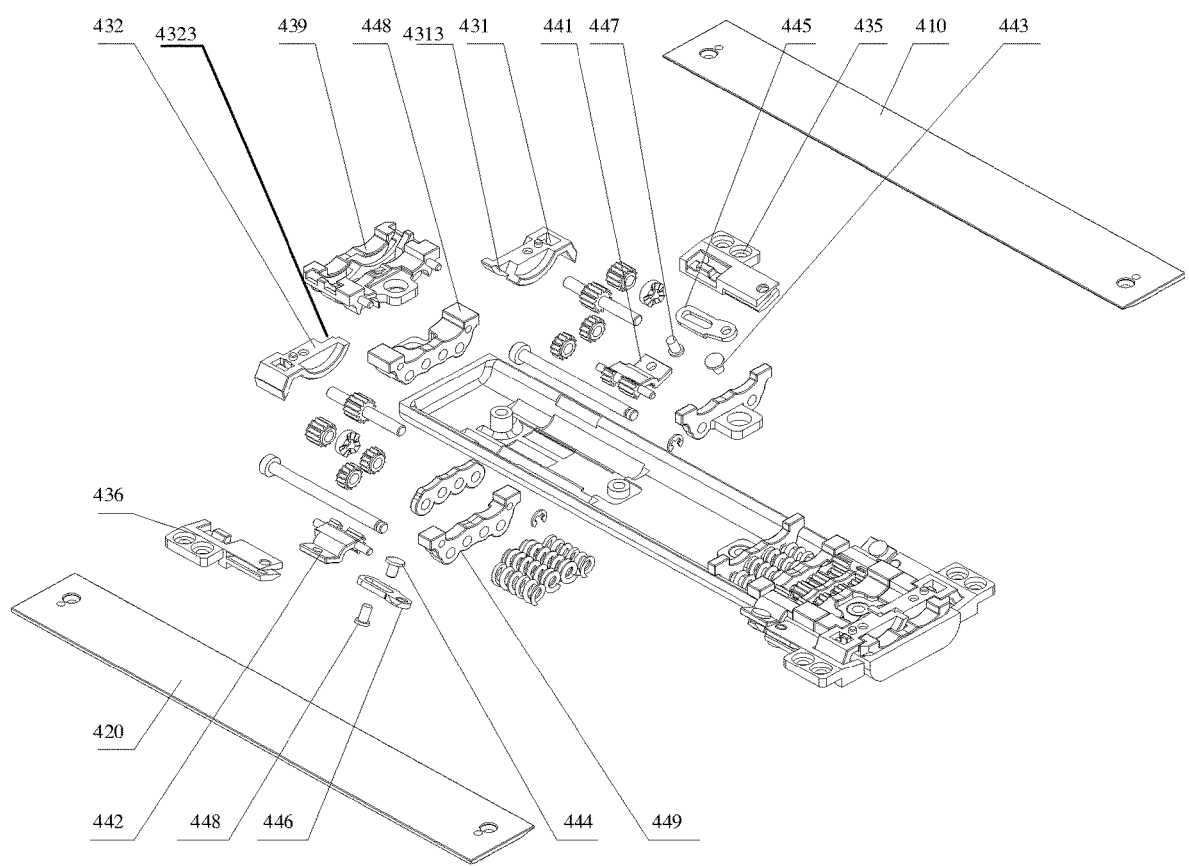
FIG. 16 illustrates a schematic exploded diagram of a rotatable connection mechanism according to some embodiments of the present disclosure.
Figure 17:
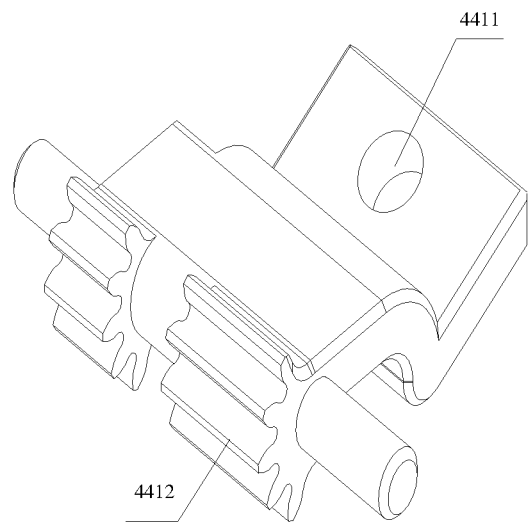
FIG. 17 illustrates a schematic structural diagram of a first transmission arm according to some embodiments of the present disclosure.

As shown in FIG. 15 to FIG. 17, by taking the first transmission arm 441 as an example, the first transmission arm 441 includes a first rotation shaft connection hole 4411 rotatably connected to the first transmission arm 443 and a gear member 4412 meshed with the transmission gear. The first connector 435 is fixedly connected to the first body of the electronic apparatus. When the external force is applied to the first body, the first body can drive the first connector 435 to move. The control structure can control the first plate and the second plate to switch between the first relative position and the second relative position through the movement of the first connector 435. The first connector 435 can drive the first transmission arm 441 to rotate through the first movable connector.

The torsion structure can include a spring, a cam, and a gear with a friction surface. Through the rotation of the first transmission arm 441, a gear tooth member 4412 of the first transmission arm 441 can drive the gear and the gear teeth to rotate to further drive the cam to rotate. The spring can be compressed through the rotation of the cam. The torsion can be transmitted under an elastic restoration force of the spring.

The present disclosure also provides an electronic apparatus. The electronic apparatus can include a first body 300, a second body 200, and a rotation connection mechanism 400. The first body 300 can be movably connected to the second body 200 through the rotation connection mechanism 400.

The first body 300 can be in the first posture with the second body 200 through the rotation connection mechanism 400. The first plate 410 of the rotation connection mechanism 400 and the second plate 420 of the rotation connection mechanism 400 can be in the first relative position. The first plate 410 and the second plate 420 can form the plate. The surface of the plate can be coplanar with the first surface of the first body 300 and the second surface of the second body 200. The surface of the plate, the first surface of the first body 300, and the second surface of the second body 200 are the surfaces shown in FIG. 2 and FIG. 3, and the surfaces facing upward in FIG. 5.

The first body 300 can be in the second posture with the second body 200 through the rotation connection mechanism 400. The first plate 410 of the rotation connection mechanism 400 and the second plate 420 of the rotation connection mechanism 400 can be in the second relative position. The first plate 410 can face the second plate 420 to have the target angle.

The first body 300 can be in the first posture with the second body 200 through the rotation connection mechanism 400. Since the first plate 410 and the second plate 420 are in the first relative position, the first plate 410 and the second plate 420 can form the plate. The surface of the plate can be coplanar with the first surface of the first body 300 and the second surface of the second body 200. Thus, in the first posture, surfaces of the first body 300, the rotation connection mechanism 400, and the second body can be in a same plane and can better provide effective support to the members on the plane (e.g., the flexible display touch screen).

The first body 300 can be in the second posture with the second body 200 through the rotation connection mechanism 400. The first plate 410 and the second plate 420 can be in the second relative position. The first plate 410 can face the second plate 420 to have the target angle to cause the first plate 410 and the second plate 420 to perform the bending guidance on the foldable screen (e.g., the flexible display touch screen) therebetween. The torsion support can be provided at the second relative position through the torsion structure. Thus, the stability of the first plate and the second plate can be ensured at the second relative position to ensure the foldable screen (e.g., the flexible display touch screen) to realize the predetermined target screen bending angle. When the first plate and the second plate are switched from the second relative position to the first relative position, the external force can be provided through the operator or the apparatus. Under the action of the external force, the torsion structure can provide the force for the control structure to control the first plate.

In some embodiments, by facilitating the bending of the foldable screen (e.g., the flexible display touch screen), the probability of the creases appearing on the foldable screen can be reduced, and the application performance of the foldable screen can be ensured.

Figure 2:
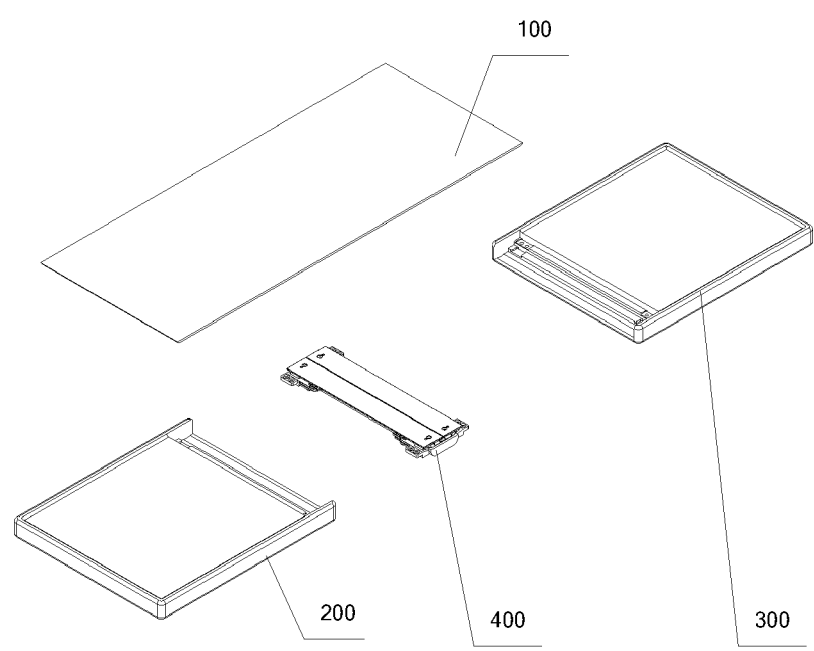
FIG. 2 illustrates a schematic exploded diagram of an electronic apparatus according to some embodiments of the present disclosure.
Figure 3:
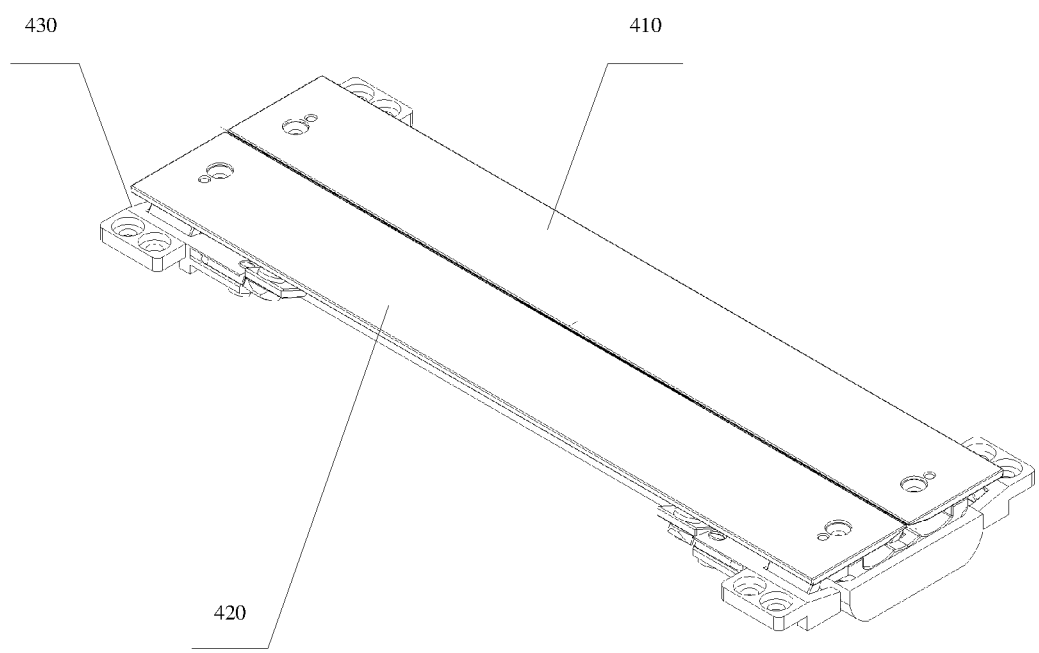
FIG. 3 illustrates a schematic structural diagram of a rotatable connection mechanism according to some embodiments of the present disclosure.
Figure 4:
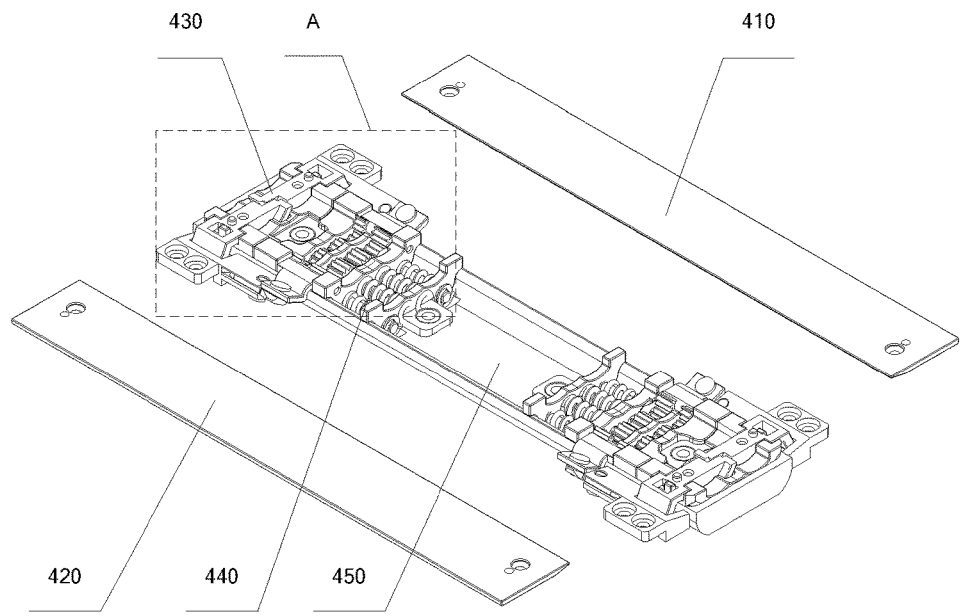
FIG. 4 illustrates a schematic exploded diagram of a rotatable connection mechanism according to some embodiments of the present disclosure.
Figure 5:
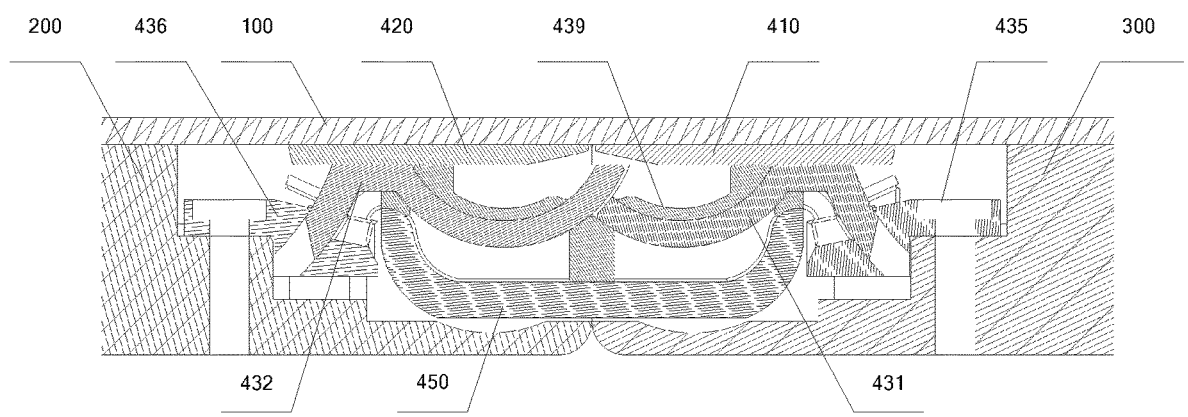
FIG. 5 illustrates a schematic sectional diagram showing a first posture of an electronic apparatus according to some embodiments of the present disclosure.
Figure 6:
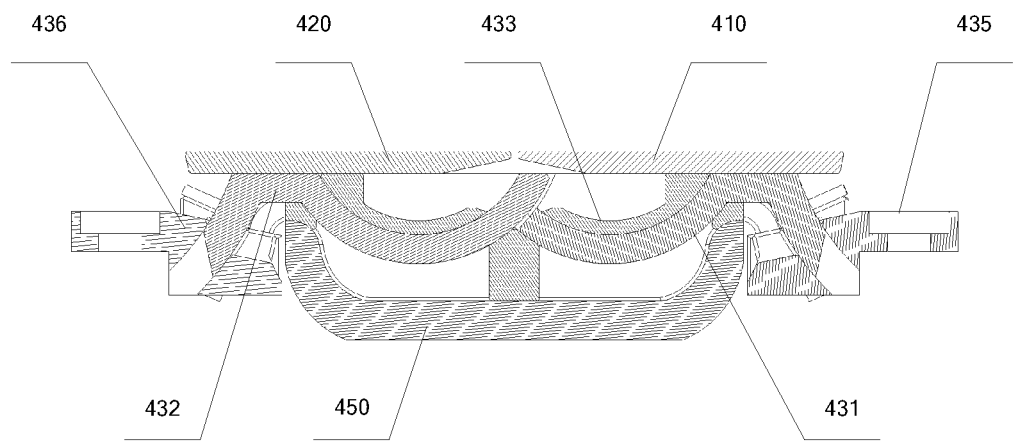
FIG. 6 illustrates a schematic sectional diagram showing a first relative position of a rotatable connection mechanism according to some embodiments of the present disclosure.

As shown in FIG. 1, FIG. 2, and FIG. 7, the electronic apparatus further includes the flexible display touch screen 100. The first part 150 of the flexible display touch screen 100 can be fixed on the first surface of the first body 300. The second part 140 of the flexible display touch screen 100 can be fixed on the second surface of the second body 200. The third part of the flexible display touch screen can be located between the first part 150 and the second part 140. The third part of the flexible display touch screen 100 can be a flexible bending part. The whole flexible display touch screen 100 can be set as a flexibly bendable area, or only the third part can be set as a flexibly bendable area.

The first part 150 of the flexible display touch screen 100 can be fixed on the first surface of the first body 300. The first connector 435 can be fixedly connected to the first body 300 of the electronic apparatus. Therefore, the position of the first connector 435 can be unchanged relative to the first part 150 of the flexible display touch screen 100. Similarly, the position of the second connector 436 can be unchanged relative to the second part 140 of the flexible display touch screen 100. Through the relative sliding cooperation between the sliding support 439 and the slider set of the control structure 430, the flexible bending requirement of the third part can be satisfied.

The first body 300 can be at the first posture with the second body 200 through the rotation connection mechanism 400. The first plate 410 and the second plate 420 can be at the first relative position to provide flat support for the third part. That is, the first plate 410 and the second plate 420 can form the plate. The surface of the plate can provide the flat support for the third part. Therefore, the third part of the flexible display touch screen 100, the first part 150, and the second part 140 can be coplanar.

The first body 300 can be at the second posture with the second body 200 through the rotation connection mechanism 400. The first plate 410 and the second plate 420 can be at the second relative position at the third part of the flexible display touch screen 100 accommodated in the space of the rotation connection mechanism 400.

As shown in FIG. 7, the first plate 410 forms a predetermined angle with the first surface of the first body 300 to cause the third part of the flexible display touch screen 100 to form the first outward folding area 130. The second plate 420 can form a predetermined angle with the second surface to cause the third part of the flexible display touch screen 100 to form the second outward folding area 120. The area of the third part of the flexible display touch screen 100 can be the inward folding area 110 outside the first outward folding area 130 and the second outward folding area 120.

The first plate 410 and the second plate 420 can be in the second relative position. The ends of the first plate 410 and the second plate 420 facing the intermediate connection shell 450 can be away from each other to form the space.

Embodiments of the present disclosure are described in a progressive manner. Each embodiment focuses on the difference from other embodiments. The same and similar parts of the embodiments can be referred to each other.

The above description of embodiments is provided to enable those skilled in the art to implement or use the present disclosure. Various modifications to embodiments of the present disclosure are apparent to those skilled in the art. The general principle defined herein can be implemented in other embodiments without departing from the spirit or scope of the present disclosure. Therefore, the present disclosure is not limited to embodiments of the present disclosure, but is to be accorded the widest scope consistent with the principles and novel features disclosed herein.

What is claimed is:

1. A rotation connection mechanism, comprising:
    a first plate;
    a second plate;
    a control structure, configured to control the first plate and the second plate to switch between a first relative position and a second relative position;
    wherein:
        the first plate and the second plate are at the first relative position, and the first plate and the second plate form a plate;
        the first plate and the second plate are at the second relative position, and the first plate faces the second plate to have a target angle;
        the control structure controls the first plate and the second plate to switch between the first relative position and the second relative position through a first set of arc-shaped sliding rails and a second set of arc-shaped sliding rails; and
        a radius of the first set of arc-shaped sliding rails is different from a radius of the second set of arc-shaped sliding rails; and
    a torsion structure, configured to provide torsion support at the first relative position and the second relative position, and provide a force for the control structure to control the first plate and the second plate to switch between the first relative position and the second relative position under an external force.

2. The rotation connection structure according to claim 1, wherein:
    the first plate and the second plate are at the first relative position and configured to shield the control structure and/or the torsion structure; and
    the first plate and the second plate are at the second relative position and configured to form a space in the rotation connection structure.

3. The rotation connection structure according to claim 1, further comprising:
    a first connector, configured to be fixedly connected to the first body; and
    a second connector, configured to be fixedly connected to the second body;
    wherein the control structure includes:
        a sliding support; and
        a slider group, including a first slider and a second slider, the first slider being fixed to the first plate and located on a side of the first plate, and the second slider being fixed to the second plate and located on a side of the second plate;
    wherein:
        the first set of arc-shaped sliding rails includes a first sub-arc-shaped sliding rail and a second sub-arc-shaped sliding rail, the first sub-arc-shaped sliding rail is arranged at the first connector, the second sub-arc-shaped sliding rail is arranged at the second connector, and the first sub-arc-shaped sliding rail and the second sub-arc-shaped sliding rail are symmetrical;
        the second set of arc-shaped sliding rails includes a third sub-arc-shaped sliding rail and a fourth sub-arc-shaped sliding rail, and the third sub-arc-shaped sliding rail and the fourth sub-arc-shaped sliding rail are symmetrically arranged at the sliding support; and
        the first slider slides in the first sub-arc-shaped sliding rail and the third sub-arc-shaped sliding rail, and the second slider slides in the second sub-arc-shaped sliding rail and the fourth sub-arc-shaped sliding rail.

4. The rotation connection structure according to claim 3, wherein:
    at an intersection of the third sub-arc-shaped sliding rail and the fourth sub-arc-shaped sliding rail or of an extension line of the third sub-arc-shaped sliding rail and an extension line of the fourth sub-arc-shaped sliding rail, a first avoidance member of the first slider cooperates with a second avoidance member of the second slider to cause the first slider and the second slider to continue to slide until the first plate and the second plate are at the first relative position.

5. The rotation connection structure according to claim 1, further comprising:
a movable connector group, including a first movable connector and a second movable connector, a first connector being connected to a first transmission arm of the torsion structure through the first movable connector, and a second connector being connected to a second transmission arm of the torsion structure through the second movable connector.

6. The rotation connection structure according to claim 5, wherein the movable connector group is configured to transmit a force for the control structure to control the first plate and the second plate to switch between the first relative position and the second relative position.

7. An electronic apparatus comprising:
a first body;
a second body;
a rotation connection mechanism, the first body being movably connected to the second body through the rotation connection mechanism; wherein:
the first body is at a first posture with the second body through the rotation connection mechanism, a first plate of the rotation connection mechanism and a second plate of the rotation connection mechanism are at a first relative position, the first plate and the second plate forming a plate, and a surface of the plate is coplanar with a first surface of the first body and a second surface of the second body;
the first body is at a second posture with the second body through the rotation connection mechanism, the first plate of the rotation connection mechanism and the second plate of the rotation connection mechanism are at the second relative position, and the first plate faces the second plate to have a target angle; and
a control structure of the rotation connection mechanism controls the first plate and the second plate to switch between the first relative position and the second relative position through a first set of arc-shaped sliding rails and a second set of arc-shaped sliding rails,
wherein a radius of the first set of arc-shaped sliding rails is different from a radius of the second set of arc-shaped sliding rails.

8. The electronic apparatus according to claim 7, further comprising:
a flexible display touch screen, a first part of the flexible display touch screen being fixed on a first surface of the first body, and a second part of the flexible display touch screen being fixed on a second surface of the second body; and
a third part of the flexible display touch screen is located between the first part and the second part, and the third part of the flexible display touch screen is a flexible bending part.

9. The electronic apparatus according to claim 8, wherein:
the first body is at a first posture with the second body through the rotation connection mechanism, and the first plate and the second plate are at the first relative position to provide a flat support for the third part to cause a third part of the flexible display touch screen to be coplanar with the first part and the second part; and
the first body is at a second posture with the second body through the rotation connection mechanism, the first plate and the second plate are at the second relative position at a third part of the flexible display touch screen accommodated within a space of the rotation connection mechanism, wherein:
the first plate has a predetermined angle with the first surface to cause the third part of the flexible display touch screen to form a first outward folding area;
the second plate has a predetermined angle with the second surface to cause the third part of the flexible display touch screen to form a second outward folding area; and
an area outside of the third part of the flexible display touch screen, the first outward folding area, the second outward folding area is an inward folding area.

10. The electronic apparatus according to claim 7, wherein:
the first plate and the second plate are at the first relative position, and the first plate and the second plate form a plate; and
the first plate and the second plate are at the second relative position, and the first plate faces the second plate to have a target angle; and
wherein the rotation connection mechanism further includes a torsion structure, configured to provide torsion support at the first relative position and the second relative position, and provide a force for the control structure to control the first plate and the second plate to switch between the first relative position and the second relative position under an external force.

11. The electronic apparatus according to claim 10, wherein:
the first plate and the second plate are at the first relative position and configured to shield the control structure and/or the torsion structure; and
the first plate and the second plate are at the second relative position and configured to form a space in the rotation connection structure.

12. The electronic apparatus according to claim 7, wherein the rotation connection mechanism further includes:
a first connector, configured to be fixedly connected to the first body; and
a second connector, configured to be fixedly connected to the second body;
wherein the control structure includes:
a sliding support; and
a slider group, including a first slider and a second slider, the first slider being fixed to the first plate and located on a side of the first plate, and the second slider being fixed to the second plate and located on a side of the second plate;
wherein:
the first set of arc-shaped sliding rails includes a first sub-arc-shaped sliding rail and a second sub-arc-shaped sliding rail, the first sub-arc-shaped sliding rail is arranged at the first connector, the second sub-arc-shaped sliding rail is arranged at the second connector, and the first sub-arc-shaped sliding rail and the second sub-arc-shaped sliding rail are symmetrical;
the second set of arc-shaped sliding rails includes a third sub-arc-shaped sliding rail and a fourth sub-arc-shaped sliding rail, and the third sub-arc-shaped sliding rail and the fourth sub-arc-shaped sliding rail are symmetrically arranged at the sliding support; and
the first slider slides in the first sub-arc-shaped sliding rail and the third sub-arc-shaped sliding rail, and the second slider slides in the second sub-arc-shaped sliding rail and the fourth sub-arc-shaped sliding rail.

13. The electronic apparatus according to claim 12, wherein:
at an intersection of the third sub-arc-shaped sliding rail and the fourth sub-arc-shaped sliding rail or of an extension line of the third sub-arc-shaped sliding rail and an extension line of the fourth sub-arc-shaped sliding rail, a first avoidance member of the first slider cooperates with a second avoidance member of the second slider to cause the first slider and the second slider to continue to slide until the first plate and the second plate are at the first relative position.

14. The electronic apparatus according to claim 7, further comprising:
a movable connector group, including a first movable connector and a second movable connector, a first connector being connected to a first transmission arm of the torsion structure through the first movable connector, and a second connector being connected to a second transmission arm of the torsion structure through the second movable connector.

15. The electronic apparatus according to claim 14, wherein the movable connector group is configured to transmit a force for the control structure to control the first plate and the second plate to switch between the first relative position and the second relative position.

16. A rotation connection mechanism, comprising:
a first plate;
a second plate;
a control structure, configured to control the first plate and the second plate to switch between a first relative position and a second relative position through a first set of arc-shaped sliding rails and a second set of arc-shaped sliding rails;
wherein:
when the first plate and the second plate are at the first relative position, the first plate and the second plate form a plate; and
when the first plate and the second plate are at the second relative position, the first plate faces the second plate to have a target angle;
wherein the control structure includes:
a slider group, including a first slider and a second slider, the first slider being fixed to the first plate and located on a side of the first plate, and the second slider being fixed to the second plate and located on a side of the second plate,
wherein when the first plate and the second plate are at the first relative position, a first avoidance member of the first slider and a second avoidance member of the second slider have a concave-convex cooperation.

* * * * *